United States Patent

Khouri et al.

[11] Patent Number: 6,088,126
[45] Date of Patent: Jul. 11, 2000

[54] FAX OVERFLOW LOOPBACK PREVENTION

[75] Inventors: Joseph F. Khouri, San Jose; Jeffrey M. Blohm, Sunnyvale; Michael E. Locke, Santa Clara, all of Calif.

[73] Assignee: Siemens Information and Communication Networks, Inc., Boca Raton, Fla.

[21] Appl. No.: 08/759,153

[22] Filed: Nov. 27, 1996

Related U.S. Application Data

[63] Continuation of application No. 08/218,477, Mar. 28, 1994, abandoned.

[51] Int. Cl.[7] .............................. H04N 1/00; H04M 11/00
[52] U.S. Cl. .......................... 358/407; 358/404; 358/405; 358/440; 379/100.09
[58] Field of Search ................................. 358/404, 405, 358/406, 434, 436, 438, 439, 440, 442, 407, 435, 437, 402, 403, 444; 379/100.09

[56] References Cited

U.S. PATENT DOCUMENTS

| | | | |
|---|---|---|---|
| 4,719,514 | 1/1988 | Kurahayashi et al. | 358/404 |
| 4,994,926 | 2/1991 | Gordon et al. | 358/440 |
| 5,014,300 | 5/1991 | Harvath et al. | 379/100 |
| 5,018,191 | 5/1991 | Catron et al. | 379/100 |
| 5,136,580 | 8/1992 | Videlock et al. | 370/60 |
| 5,204,757 | 4/1993 | Agudelo et al. | 358/407 |
| 5,282,238 | 1/1994 | Berland | 379/100 |
| 5,291,302 | 3/1994 | Gordon et al. | 358/440 |
| 5,293,253 | 3/1994 | Kida et al. | 358/404 |
| 5,396,493 | 8/1993 | Sugiyama | 370/60 |
| 5,633,865 | 5/1995 | Short | 370/412 |
| 5,729,595 | 3/1998 | Kugell et al. | 379/100.09 |
| 5,881,136 | 9/1993 | Tasker et al. | 379/100.09 |

OTHER PUBLICATIONS

"Fax Buyer's Guide", Guide No. 6, Bedford Communications, Inc., pp. 67 and 68. 1992.

*Primary Examiner*—Kimberly A. Williams

[57] ABSTRACT

Method for preventing a facsimile server from looping back on itself, the method including the steps of: (a) transmitting fax server identifier information during fax transmission setup; (b) analyzing the fax server identifier information to determine whether the fax server identifier information is the same as that of the fax server that is placing the call; and (c) if the fax server identifier information is the same, dropping the call, otherwise, continuing the call. In a preferred embodiment, the fax identifier information is transmitted in the NSF command of the facsimile communication protocol.

11 Claims, 2 Drawing Sheets

FAX OVERFLOW LOOPBACK PREVENTION

CROSS-REFERENCE TO RELATED APPLICATION

This is a continuation of Ser. No. 08/218,447, filed Mar. 28, 1994, abandoned.

TECHNICAL FIELD OF THE INVENTION

The present invention pertains to a method for preventing a facsimile overflow server from undesirably overflowing back into itself.

BACKGROUND OF THE INVENTION

With increased use of facsimile as a means of exchanging information, a fax overflow feature has been increasing in popularity. FIG. 1 shows, in pictorial form, a hardware configuration which illustrates the manner in which the fax overflow feature operates. As shown in FIG. 1, private branch exchange 100 ("PBX" 100) is connected to fax server 110, fax device 120, and fax device 130. Assume that fax device 120 calls fax device 130 to deliver a fax document X. If fax device 130 is unavailable for some reason, for example, because it is already busy, broken, or so forth, PBX 100 forwards the call from fax device 120 to fax server 110; fax server 110 is designated as a fax overflow device for fax device 130.

Fax server 110: (a) answers the call forwarded from fax device 120; (b) receives fax document X; and (c) stores fax document X, for example, on disk storage unit 115. At a later time, fax server 110 calls fax device 130 and attempts to deliver fax document X. This step is repeated until delivery of fax document X to fax device 130 is successfully completed. Then, fax server 110 deletes the stored copy of fax document X from disk storage unit 115.

A problem occurs in the above which is understood as follows. Assume that fax server 110 calls fax device 130 and attempts to deliver fax document X. However, if fax device 130 is unavailable, the call is forwarded back to fax server 110. Fax server 110 then delivers fax document X to itself. The previously stored copy of fax document X will be deleted and an identical, or somewhat degraded, new copy of the same fax document X is stored for delivery at a later time to fax device 130. The last few steps can be repeated many times, depending on the availability of fax device 130 and the frequency with which delivery of fax document X to fax device 130 is attempted. Note that every time fax server 110 delivers fax document X to itself it is doing unnecessary work which ties up its resources and serves no purpose since no progress is made toward achieving the ultimate goal of delivering fax document X to fax device 130. In addition, the unnecessary deliveries can cause incorrect fax logs, delivery time, and so forth to be generated by fax server 110.

The following discusses several attempts in the prior art to solve the above-identified problem. Solution 1: When fax server 110 calls fax device 130 to deliver fax document X, PBX 100 is instructed by fax server 110 not to forward the call if the destination, i.e., fax device 130, is not available. Solution 2: PBX 100 is configured not to forward a call back to the source of that call. Solution 3: Attempt to increase the availability of fax device 130. Solution 4: Increase the time period between the time at which fax server 110 receives fax document X and the time at which fax server 110 attempts to deliver fax document X to fax device 130.

Each of the prior art solutions have disadvantages. Solutions 1 and 2 are disadvantageous in that they are not universal. That is, they depend on PBX 110 to provide capabilities needed to implement the solution. This is disadvantageous in that not all PBXs allow a caller to specify that a call is not to be forwarded to an alternate destination. In addition, not all PBXs can be configured not to forward a call back to its source. Solution 2 is further disadvantageous in that there may be some situations where it may be desirable to have the call forwarded back to its source.

Solutions 3 and 4 are disadvantageous in that they do not eliminate the problem; they merely decrease the probability of its occurrence. Therefore, every time fax server 110 delivers fax document X to itself, it is doing unnecessary work which uses and ties up its resources. In addition, there is a chance that the newly stored copy of fax document X is either of equal or lesser quality than the original fax document. Further, solution 3 is not always very practical since the availability of fax device 130 cannot always be increased to the acceptable level and solution 4, under many circumstances, will cause a delay in the delivery of fax document X to fax device 130.

In light of the above, there is a need in the art for a method for preventing a facsimile overflow server from overflowing back into itself,

SUMMARY OF THE INVENTION

Advantageously, embodiments of the present invention are methods for preventing a facsimile overflow server from overflowing back into itself In particular, an embodiment of the inventive method comprises: (a) transmitting fax server identifier information during fax transmission setup; (b) analyzing the fax server identifier information to determine whether the fax server identifier information is the same as that of the fax server that is placing the call; and (c) if the fax server identifier information is the same, terminating call, otherwise, continuing the call.

DETAILED DESCRIPTION

Figure 1:
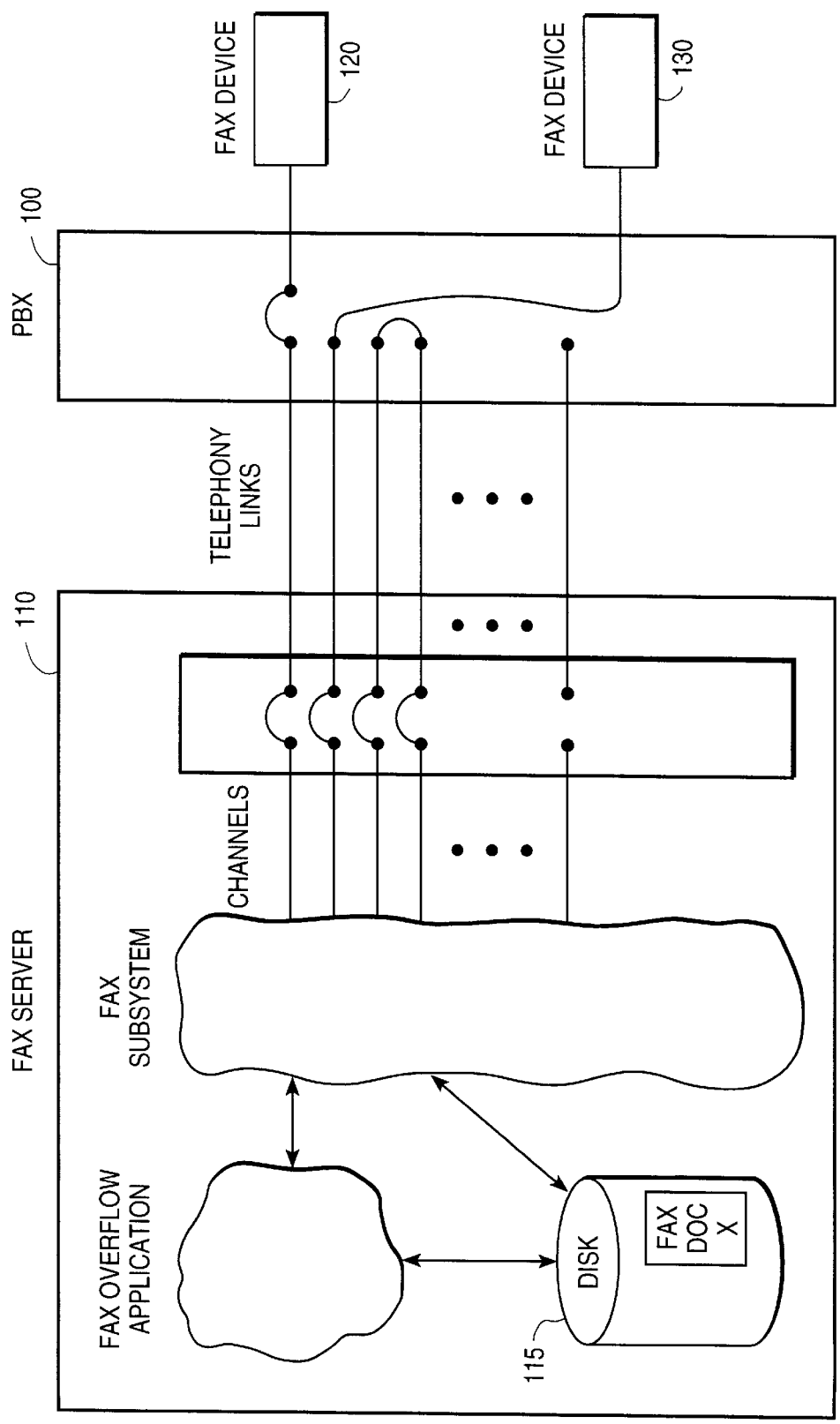
FIG. 1 shows, in pictorial form, a hardware configuration which helps illustrate the manner in which a fax overflow feature operates.

FIG. 1 shows, in pictorial form, a hardware configuration which helps illustrate the manner in which a fax overflow feature operates. The general manner in which the hardware operates to provide a fax overflow feature has been described in the prior art. The following describes an improvement to the fax overflow feature which solves the problems identified in the Background of the Invention.

Figure 2:
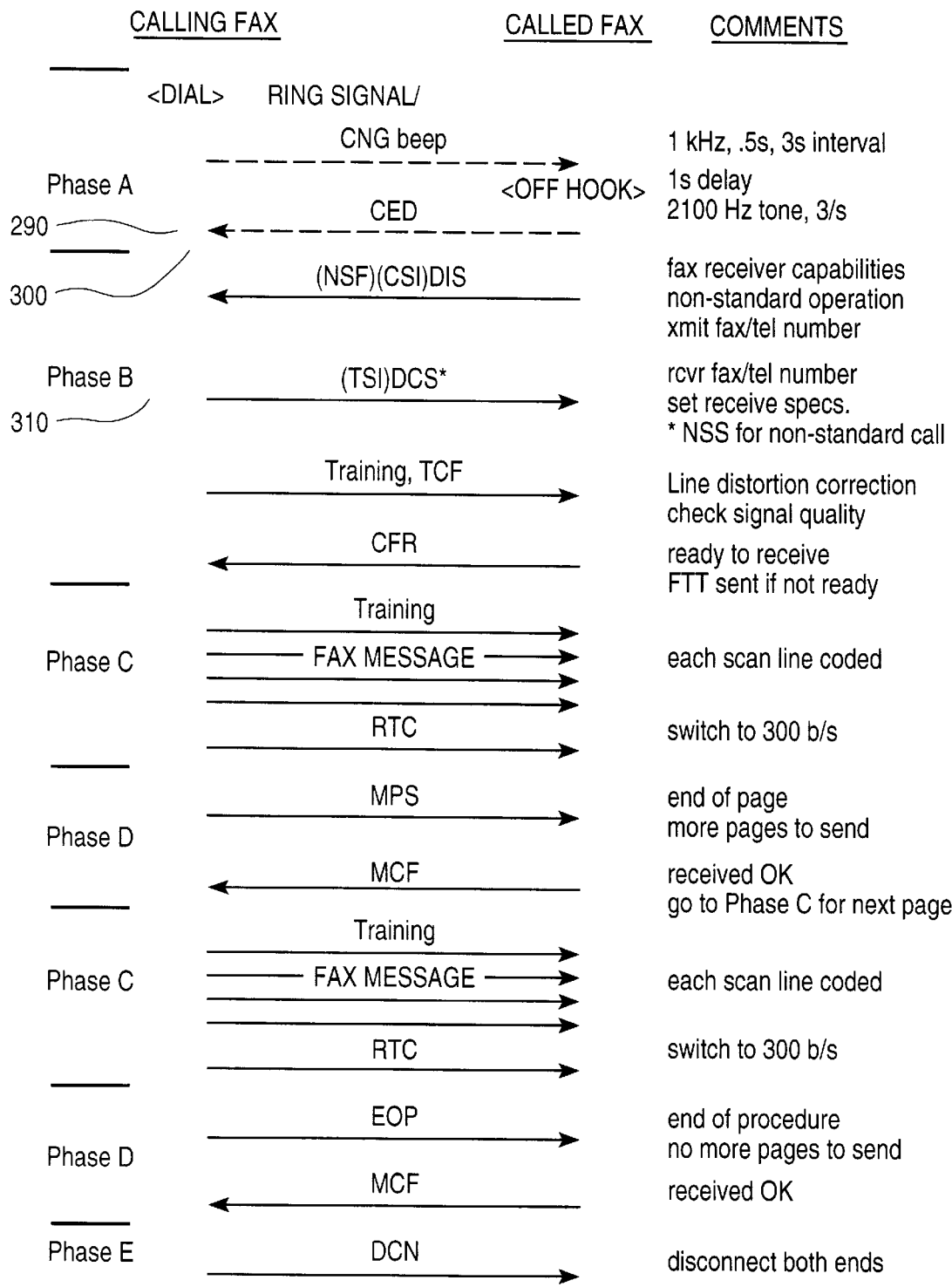
FIG. 2 illustrates a Group 3 fax delivery of a two page fax document.

FIG. 2 illustrates a Group 3 fax delivery of a two page fax document. FIG. 2 shows the commands used in accordance with the T.30 Fax Protocol Recommendation by the CCITT. As specified by the T.30 Fax Protocol Recommendation by the CCITT, a Non Standard Facilities ("NSF") command is an optional command that can be sent by a called fax server (or fax device) to a-calling fax server (or device), refer to line 300 in FIG. 2. As shown in FIG. 2, the NSF command, if used, is sent during the initial negotiation phase which is near the beginning of a Fax Session and prior to any exchange of Fax Image Data, i.e., the Fax Message. In accordance with the present invention, use is made of the NSF command in the following manner to solve the problem identified in the Background of the Invention.

In accordance with the present invention, as part of the NSF command, a "fax application identifier" is sent by the called fax device to the calling fax server, refer to line 300 of FIG. 2. The "fax application identifier" is defined to be a unique string of information which identifies the fax application and called fax server which will be receiving the fax document to be transmitted. For example, in one embodiment of the present invention, the "fax application identifier" comprises the fax application type (for example, fax overflow, fax messaging, and so forth) and the international telephone number of the called fax device. The manner of generating an apparatus for generating the NSF command are well known to those of ordinary skill in the art.

In accordance with the present invention, the calling fax server, upon receiving the NSF command from the called fax device, analyzes the command to determine whether to proceed with or to abort the given Fax session. For example, in accordance with the present invention, if the "fax application identifier" in the NSF command corresponds to the fax overflow application on the same fax server, i.e., the calling fax server, then the fax session is aborted and the problem of doing an unnecessary fax delivery as described in the Background of the Invention is completely avoided. The manner of checking and apparatus such as a microprocessor apparatus for checking the fax application identifier in the NSF command are well known to those of ordinary skill in the art.

The following describes the manner in which the hardware configuration operates in carrying out the present invention. As shown in FIG. 1, private branch exchange 100 ("PBX" 100) is connected to fax server 110, fax device 120, and fax device 130. Assume that fax device 120 calls fax device 130 to deliver a fax document X. If fax device 130 is unavailable for some reason, for example, because it is already busy, broken, or so forth, PBX 100 forwards the call from fax device 120 to fax server 110; fax server 110 is designated as a fax overflow device for fax device 130. Fax server 110: (a) answers the call forwarded from fax device 120; (b) receives fax document X; and (c) stores fax document X.

At a later time, fax server 110 calls fax device 130 and attempts to deliver fax document X. However, if fax device 130 is unavailable, the NSF is forwarded back to fax server 110. Fax server 110 now receives and checks the fax application identifier. Since the fax application identifier came from fax server 110 in the first place, there will be a match between the fax application identifier in the NSF command and the fax application identifier of fax server 110. In response to the match, fax server 110 will terminate the call. However, if there is no match, fax server 110 will transmit the stored copy of document X and then delete the stored copy of fax document X.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention.

The following discusses variations of the present invention. In a first variation, the Called Subscriber Identification ("CSI") command defined by the T.30 Fax Protocol can be used in place of the NSF command, refer to line 300 in FIG. 2. The CSI command is transmitted by the called fax server to the calling fax server and contains the international telephone number of the called fax server. Therefore, the calling fax server can determine that it is doing a fax delivery from and to itself by checking the CSI command received. This variation is not preferred because it can forbid a fax server from doing a fax delivery to itself In a second variation, one can utilize both the NSF and the CSI commands as discussed above.

In a third variation, the Transmitting Subscriber Identification ("TSI") command defined by the T.30 Fax Protocol can be utilized in place of the NSF command, refer to line 310 in FIG. 2. The TSI command is transmitted by the calling fax server to the called fax server and contains the international telephone number of the calling fax server. Therefore, the called fax server can determine that it is doing a fax delivery from and to itself by checking the TSI command received. This solution is not preferred since it has the same disadvantage as the first variation. In addition, it has a further disadvantage since TSI transmitted after the NSF and the CSI so that it will take a little bit longer to get to the point of aborting an undesired fax delivery.

In a fourth variation, a non-standard signal tone is transmitted (for example, a 980 Hz tone is transmitted for one second) before the CED command from the called fax to the calling fax, refer to line 290. Note, however, that this variation is not preferred because some fax equipment may not work properly in the presence of non-standard tones.

In a further embodiment of the present invention, fax server 110 of FIG. 1 keeps track of the number of times a delivery from fax server 110 to fax device 130 was forwarded back to fax server 110. The manner of keeping a counter for keeping track of such events, for example, in a database at the fax server is well known to those of ordinary skill in the art. Further, reports utilizing such counters can provide information on the availability of fax device 130 to help identify whether it is broken and so forth. The manner of making reports from, for example, a database at a fax server is well known to those of ordinary skill in the art.

For ease of understanding the present invention, fax server 110 was described as being a single node server. However, the present invention is not restricted to this case. In fact, embodiments of the present invention operate equally as well in a multinode environment wherein fax server 110 is contained, together with a plurality of fax servers, within the same cluster. A cluster is a defined group of fax servers associated with each other in some way (for example, they belong to the same company). Now, consider a situation where fax server 110 attempts to deliver a fax document X to an unavailable fax device 130 and the call ends up being forwarded to another fax server within the same cluster. By examining, for example, information contained within the NSF command, the other fax server can determine that the given fax delivery is undesirable and refuse to accept it. Thus, assume that each fax server knows its cluster ID by, for example, reference to a look-up table. Then, in accordance with the present invention, putting the cluster ID in the NSF enables a fax server receiving a call to determine whether the call is from a fax server within its cluster. This information can serve as a basis for rejecting that call.

For ease of understanding, the present invention has been described as preventing undesired, closed loop, fax delivery. However, the present invention is not restricted to this case. In fact, the present invention may be utilized to prevent any undesired, closed loop, fax delivery, i.e. for applications other than for fax overflow.

Lastly, embodiments of the present invention can be utilized to determine alternate routing information for use in efficiently forwarding calls. Assume that a document is stored in a Fax On Demand ("FOD") server. Further assume that the document is requested by a user of the FOD server for delivery to, for example, the user's fax server. Still further, assume that the user's fax server is busy when the time for delivery occurs. Yet still further assume that the call is routed to the user's mailbox on another messaging system (a fax server). When the messaging system responds, the FOD server recognizes the messaging system fax server by the fax identifier information transmitted in, for example, the NSF command. Using the fax identifier information, the FOD server can reroute the fax via a digital backbone network in accordance with data stored in a database which is accessed using, for example, the fax application identifier of the messaging system. This is advantageous in that it reduces transmission costs, increases delivery quality, and reduces equipment utilization time.

What is claimed is:

1. A method for preventing a facsimile server from looping back on itself when placing a call to a fax device, the method comprising the steps of:

transmitting facsimile server identification information during fax transmission setup when placing a call to said fax device, said facsimile server identification information identifying an application of said facsimile server;

receiving source identification information, said source identification information identifying the source of a call, when answering a call;

analyzing the received source identification information to determine whether the source identification information matches the facsimile server identification information transmitted by said facsimile server when said facsimile server places a call; and terminating the call if the both of the following occur: the received source identification information matches the facsiile server identification information; and the identified application has been predefined to require termination of the call.

2. The method of claim 1 wherein the step for transmitting comprises transmitting the facsimile server identification information in an NSF command of a facsimile communication protocol.

3. The method of claim 1 wherein the step of transmitting comprises transmitting the facsimile server identification information in a CSI command of a facsimile communication protocol.

4. The method of claim 1 wherein the step of transmitting comprises transmitting the facsimile server identification information in a TSI command of a facsimile communication protocol.

5. The method of claim 1 wherein the step of transmitting comprises transmitting the facsimile server identification information in an NSF and a CSI command of a facsimile communication protocol.

6. The method of claim 1 wherein the facsimile server is part of a cluster and the facsimile server identification information includes cluster identification information.

7. The method of claim 1 wherein the step of terminating the call further comprises a count of instances wherein a call is terminated.

8. The method of claim 7 which further comprises reporting the count.

9. The method of claim 1 wherein said fax device is a second fax server.

10. The method of claim 1 wherein the step of transmitting comprises transmitting the facsimile server identification information in a tone before a CED signal.

11. A method for rerouting a call from a calling facsimile server to a recipient fax machine comprising the steps of:

when the recipient fax machine is unable to accept the call, forwarding the call to a rerouting facsimile server;

transmitting identifier information of the rerouting facsimile server to the calling facsimile server during fax transmission setup;

using the facsimile server identifier information of the rerouting facsimile server to access a database;

retrieving from the database routing information associated with the facsimile server identifier information of the rerouting facsimile server; and routing the call to the recipient facsimile machine in accordance with the routing information.

* * * * *